(12) United States Patent
Saito

(10) Patent No.: US 8,634,659 B2
(45) Date of Patent: Jan. 21, 2014

(54) IMAGE PROCESSING APPARATUS, COMPUTER READABLE MEDIUM STORING PROGRAM, AND IMAGE PROCESSING METHOD

(75) Inventor: Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 99 days.

(21) Appl. No.: 13/221,533

(22) Filed: Aug. 30, 2011

(65) Prior Publication Data

US 2012/0243796 A1 Sep. 27, 2012

(30) Foreign Application Priority Data

Mar. 23, 2011 (JP) ................................. 2011-064770

(51) Int. Cl.
*G06K 9/68* (2006.01)
(52) U.S. Cl.
USPC .......................................... 382/218; 382/266
(58) Field of Classification Search
None
See application file for complete search history.

(56) References Cited

U.S. PATENT DOCUMENTS

| 5,640,200 A * | 6/1997 | Michael .......................... 348/87 |
| 2007/0263915 A1* | 11/2007 | Mashiach ...................... 382/130 |
| 2009/0092336 A1* | 4/2009 | Tsurumi ........................ 382/294 |
| 2010/0303342 A1* | 12/2010 | Berg et al. ..................... 382/155 |

FOREIGN PATENT DOCUMENTS

| JP | 06-149964 A | 5/1994 |
| JP | 10-063856 A | 3/1998 |
| JP | 2004-287682 A | 10/2004 |
| JP | 2004-341914 A | 12/2004 |
| JP | 2009-199126 A | 9/2009 |

OTHER PUBLICATIONS

Vladimir Vezhnevets and Vadim Konouchine, "GrowCut—Interactive Multi-Label N-D Image Segmentation By Cellular Automata", 2005, In Proc. of Graphicon.*

* cited by examiner

*Primary Examiner* — Bhavesh Mehta
*Assistant Examiner* — Siamak Harandi
(74) *Attorney, Agent, or Firm* — Sughrue Mion, PLLC

(57) ABSTRACT

An image processing apparatus includes the following elements. An image receiving unit receives a first image and a second image. A first specified area specifying unit allows a user to specify a first specified area in the first image. A first comparison area setting unit sets a first comparison area in the first image on the basis of the first specified area. A second comparison area setting unit sets a second comparison area in the second image. A geometric difference correction unit corrects a difference in geometric properties between a first comparison image in the first comparison area and a second comparison image in the second comparison area. An image output unit outputs an image in which the second comparison image is superimposed on the first comparison image or a difference image between the first comparison image and the second comparison image.

14 Claims, 13 Drawing Sheets

IMAGE PROCESSING APPARATUS, COMPUTER READABLE MEDIUM STORING PROGRAM, AND IMAGE PROCESSING METHOD

CROSS-REFERENCE TO RELATED APPLICATIONS

This application is based on and claims priority under 35 USC 119 from Japanese Patent Application No. 2011-064770 filed Mar. 23, 2011.

BACKGROUND

Technical Field

The present invention relates to an image processing apparatus, a computer readable medium storing a program, and an image processing method.

SUMMARY

According to an aspect of the invention, there is provided an image processing apparatus including an image receiving unit, a first specified area specifying unit, a first comparison area setting unit, a second comparison area setting unit, a geometric difference correction unit, and an image output unit. The image receiving unit receives a first image and a second image. The first specified area specifying unit allows a user to specify a first specified area in the first image. The first comparison area setting unit sets a first comparison area in the first image on the basis of the first specified area. The second comparison area setting unit sets a second comparison area in the second image. The geometric difference correction unit corrects a difference in geometric properties between a first comparison image in the first comparison area and a second comparison image in the second comparison area. The image output unit outputs an image in which the second comparison image is superimposed on the first comparison image or a difference image between the first comparison image and the second comparison image.

BRIEF DESCRIPTION OF THE DRAWINGS

Exemplary embodiment(s) of the present invention will be described in detail based on the following figures, wherein.

DETAILED DESCRIPTION

Figure 1:
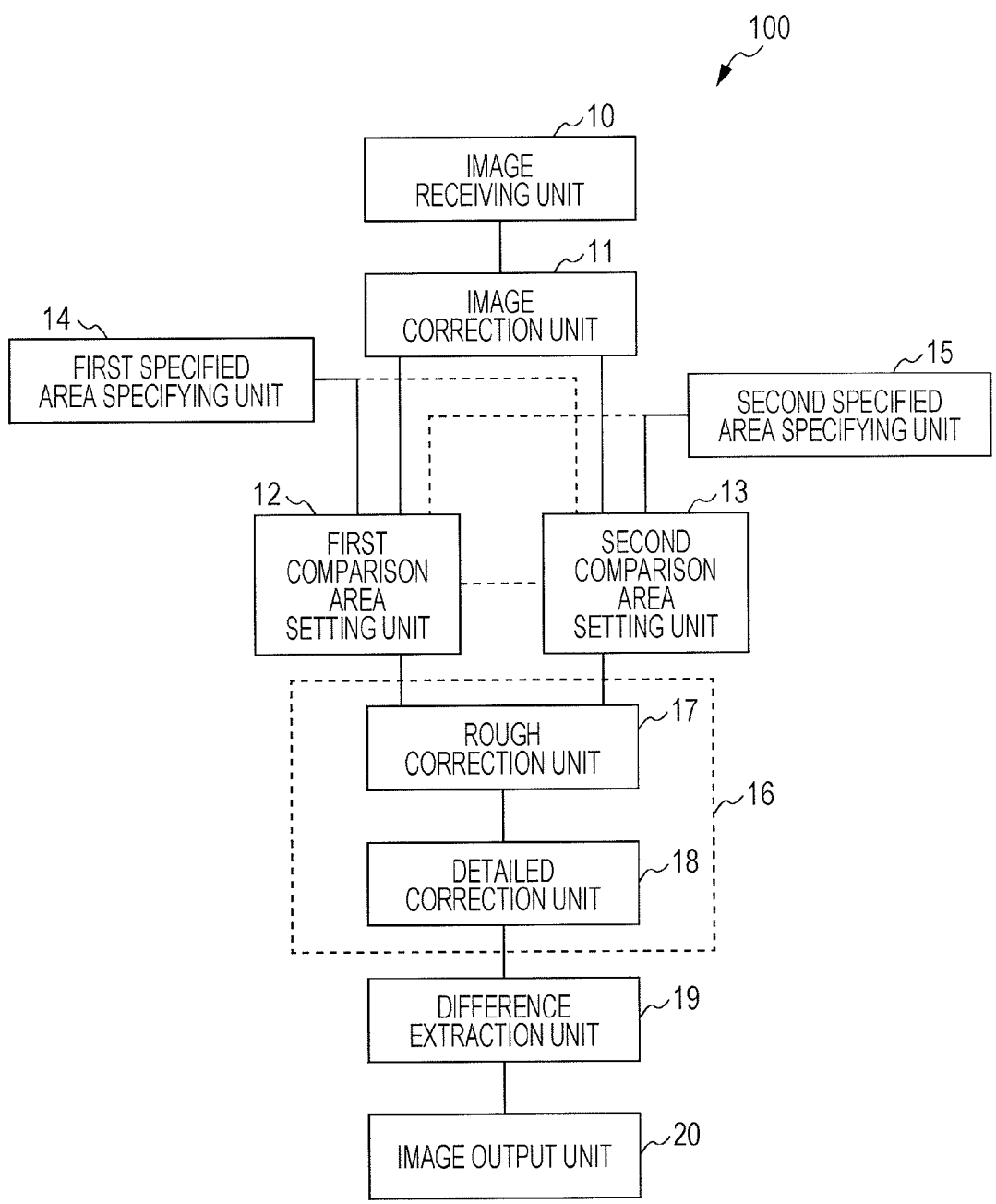
FIG. 1 is a functional block diagram of an image processing apparatus according to a first exemplary embodiment of the present invention.

FIG. 1 is a functional block diagram of an image processing apparatus 100 according to a first exemplary embodiment of the present invention.

Figure 2:
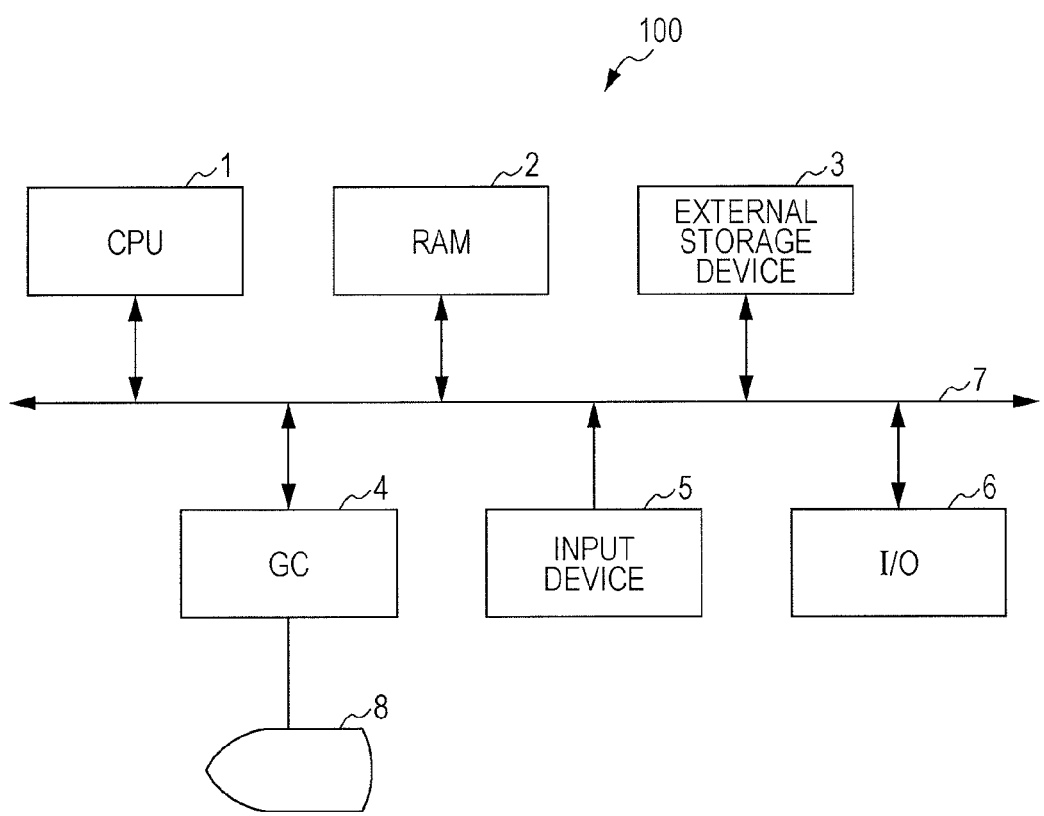
FIG. 2 is a hardware configuration diagram of the image processing apparatus that is implemented using a general computer.

The image processing apparatus 100 may be implemented using a general computer that is a physically general-purpose information processing apparatus. FIG. 2 is a hardware configuration diagram of the image processing apparatus 100 implemented using a general computer. As illustrated in FIG. 2, the image processing apparatus 100 includes a central processing unit (CPU) 1, a random access memory (RAM) 2, an external storage device 3, a graphics controller (GC) 4, an input device 5, and an input/output (I/O) 6, which are connected to one another via a data bus 7 so as to be able to exchange electrical signals with one another. The external storage device 3 may be a device capable of statically recording information, such as a hard disk drive (HDD) or a solid state drive (SSD). A signal from the GC 4 is output on a monitor 8 that allows a user to visually recognize an image, such as a cathode ray tube (CRT) display or a flat panel display, and is displayed as an image. The input device 5 may be a device operated by a user to input information, such as a keyboard, a mouse, or a touch panel, and the I/O 6 may be an interface through which the image processing apparatus 100 exchanges information with an external device or a computer. A computer program for causing the computer to operate as the image processing apparatus 100 may be executed on the computer to virtually implement the image processing apparatus 100. The computer program for causing the computer to operate as the image processing apparatus 100 may be recorded on any suitable information recording medium such as a digital versatile disk read only memory (DVD-ROM) or a compact disk read only memory (CD-ROM) and provided, or may be provided as a computer-readable electrical signal via a telecommunications line such as a public line, for example, the Internet. FIG. 2 illustrates an example of a general computer serving as an information processing apparatus that is used to implement the image processing apparatus 100, and the configuration of the image processing apparatus 100 is not limited to that illustrated in FIG. 2. The image processing apparatus 100 may be implemented not only as a general computer but also as a dedicated apparatus using a microcontroller, a digital signal processor (DSP), or any other suitable device. The image processing apparatus 100 may also be constructed as an apparatus that is operable alone or may be constructed as a module that is mounted in or added to an office machine such as a copying machine or a facsimile.

The functional blocks of the image processing apparatus 100 illustrated in FIG. 1 are illustrative for the purpose of explanation in terms of the functions of the image processing apparatus 100 implemented by using the computer program, and each functional block may not necessarily exist physically.

An image receiving unit 10 may be an interface that receives a first image and a second image, which are to be compared, from outside as electronic data. Each of the first image and the second image may be an image recorded on a physical medium such as a sheet of paper or a microfilm, or may be an image recorded as electronic data. The image receiving unit 10 may be any component configured to receive images as electronic data. For example, the image receiving unit 10 may be a "socket" that inputs and outputs information between processes on a computer, or may be a unit connected to a network such as a local area network (LAN) or a wide area network (WAN) including a public line such as the Internet, such as a telecommunications line or an information recording medium reader, or a unit that converts image information on a medium such as a sheet of paper or a microfilm into an electronic image and that reads the electronic image, such as a scanner. Alternatively, the image receiving unit 10 may include plural units among the above units. Regarding the above examples, referring to FIG. 2, the image receiving unit 10 corresponds to the I/O 6 physically serving as a telecommunications line, or an information recording medium reader or a scanner connected to the I/O 6. If the image receiving unit 10 is a socket, the image receiving unit 10 may be virtually implemented by software, and no physical entity exists. The electronic data to be received may have any format including a vector data format such as Drawing Exchange Format (DXF), a data format having metadata, such as a format using a page description language, such as Portable Document Format (PDF), or a format using a markup language such as Extensible Markup Language (XML), and a simple raster data format. If the electronic data is not raster data, the electronic data may be, but not necessarily be, extended to raster data for convenience of subsequent processing.

The first image and the second image may be arbitrary, and are preferably, but not limited to, images having portions which the user wishes to compare. Examples of the images include an original drawing and a modified drawing obtained by partially modifying a certain part in the drawing or by modifying the shape of the part, and an original drawing and a different drawing including a portion of the original drawing. It is to be understood that the first image and the second image are not to be limited to drawings.

The first image and second image received by the image receiving unit 10 are delivered to an image correction unit 11. The image correction unit 11 is a unit that performs correction so that the attributes of the first image and the attributes of the second image are made to match. The term "attributes of an image" refers to the features of the image regardless of what data the image includes, including the size of the image, the resolution of the image, and whether the image is in monochrome or color. The size of an image may be specified by information representing the size of paper, such as A3 or A2, or by the dimensions of the image or the number of pixels of the image. Since images generally have a rectangular shape, the longitudinal and lateral dimensions of an image or the number of pixels of the image may be specified to specify the size of the image by the dimensions of the image or the number of pixels of the image. If the attributes of the first image and the attributes of the second image do not match, the image correction unit 11 performs correction so that the attributes of one of the images may match the attributes of the other image or the attributes of both images may be equal to predetermined attributes. The correction may be performed in any way; however, preferably, correction is performed so that the attributes of the image having a smaller amount of information may match the attributes of the image having a larger amount of information. For example, if images have different sizes, the attributes of the smaller image may be made to match the attributes of the larger image. If images have different resolutions, the attributes of the lower resolution image may be made to match the attributes of the higher resolution image. Or, if images are in monochrome and color, the attributes of the monochrome image may be made to match the attributes of the color image. However, if it is not necessary to compare differences between colors, the attributes of the color image may be made to match the attributes of the monochrome image. In this case, the images may be binarized into images having two colors, namely, black and white, to reduce the load for subsequent information processing.

The first image obtained after correction is delivered to a first comparison area setting unit 12, and the second image obtained after correction is delivered to a second comparison area setting unit 13. The first comparison area setting unit 12 is a unit that sets a first comparison area in the first image on the basis of a first specified area specified by a first specified area specifying unit 14 described below. The second comparison area setting unit 13 is a unit that sets a second comparison area in the second image. In this exemplary embodiment, the second comparison area setting unit 13 is configured to set a second comparison area in the second image on the basis of a second specified area specified by a second specified area specifying unit 15 described below; however, the second comparison area setting unit 13 may not necessarily set a second comparison area on the basis of the second specified area. The first comparison area setting unit 12 and the second comparison area setting unit 13 will be described below.

The term "comparison area", as used herein, refers to a closed area that is a portion of an image actually extracted in the image processing apparatus 100 as an object to be compared. The term "specified area", as used herein, refers to an area input by a user operating the image processing apparatus 100 to specify a portion of an image to be compared. A specified area and a comparison area may be identical, in other words, a specified area may be simply used as a comparison area. However, users may compare unwanted portions of the images due to their improper operation. To provide accurate comparison between intended portions of the images, in this exemplary embodiment, processing described below is performed to obtain comparison areas. Therefore, a specified area and a comparison area may not necessarily be identical. An image included in a specified area is referred to as a "specified image", and an image included in the comparison area is referred to as a "comparison image".

The first specified area specifying unit 14 receives a first specified area that is an area specified in the first image by a user, and delivers the first specified area to the first comparison area setting unit 12. Depending on the situation, the first specified area may also be delivered to the second comparison area setting unit 13 (indicated by a broken line in FIG. 1). The first specified area specifying unit is a unit that allows a user to specify a first specified area in the first image. The specific configuration of the first specified area specifying unit 14 is not particularly limited, and the first specified area specifying unit 14 may be configured in a variety of ways. For example, the first specified area specifying unit 14 may be configured to allow a user to specify a desired area in the first image displayed on the monitor 8 (see FIG. 2) using the input device 5 (see FIG. 2) such as a mouse or a touch panel, or may be configured to allow a user to specify one or plural graphical objects in the first image using the input device 5 after the graphical objects have been subjected to the labeling process in advance. Alternatively, the first specified area specifying unit 14 may be configured to allow a user to draw lines that surround a desired area using a marker pen or the like on a paper medium on which the first image is recorded and to specify the desired area by recognizing the lines from the first image read by the image receiving unit 10. No problem arises if the area specified by the user is a closed area. However, a boundary input by the user to specify a desired area may not necessarily define a closed area depending on the configuration of the first specified area specifying unit 14. In this case, the first specified area specifying unit 14 may specify the first specified area by taking the convex hull or bounding rectangle of the boundary input by the user. Similar processing may be performed when the user specifies a graphical object. In this exemplary embodiment, the user may specify a rectangle indicating a desired position in the first image displayed on the monitor 8 (see FIG. 2) by specifying opposing vertices of the rectangular frame using a drag operation of a mouse. Therefore, the first specified area obtained in this exemplary embodiment may always be a closed rectangular area. The above methods are illustrative and, for example, a user may draw a free curve using an input device such as a mouse or a touch panel, or may sequentially specify the vertices of a polygon.

In this exemplary embodiment, the second specified area specifying unit 15 may be the same, or substantially the same, as the first specified area specifying unit 14, except that the second specified area specifying unit 15 allows a user to specify a second specified area that is an area specified in the second image and delivers the second specified area to the second comparison area setting unit 13, and the description of the second specified area specifying unit 15 is thus omitted. Similarly to the first specified area specifying unit 14, the second specified area specifying unit 15 may also deliver the second specified area to the first comparison area setting unit 12 depending on the situation. Further, the second specified area specifying unit is a unit that allows a user to specify a second specified area in the second image.

As described above, the first comparison area setting unit 12 is configured to set a first comparison area by correcting the first specified area that may be incompletely specified by the user. There are a variety of setting methods, and one or plural methods may be employed from among the following methods. Alternatively, any other method may be employed, or the user may select which method to use. The methods available here may be roughly divided into (1) methods of setting a first comparison area on the basis of only the first specified area (including a first specified image), and (2) methods of setting a first comparison area on the basis of both the first specified area and the second specified area.

First, the first methods, that is, the methods of setting a first comparison area on the basis of only the first specified area (including the first specified image), include:

(1) Simply setting a first specified area as a first comparison area.
(2) Setting a first comparison area on the basis of a first specified image included in the first specified area. This method has many approaches, including simply setting a closed area including the first specified image as a first comparison area, where the first comparison area may be defined as the bounding rectangle or convex hull of the first specified image. Another approach is to set a first comparison area on the basis of the relationship between the first specified area and the first specified image.

Figure 3:
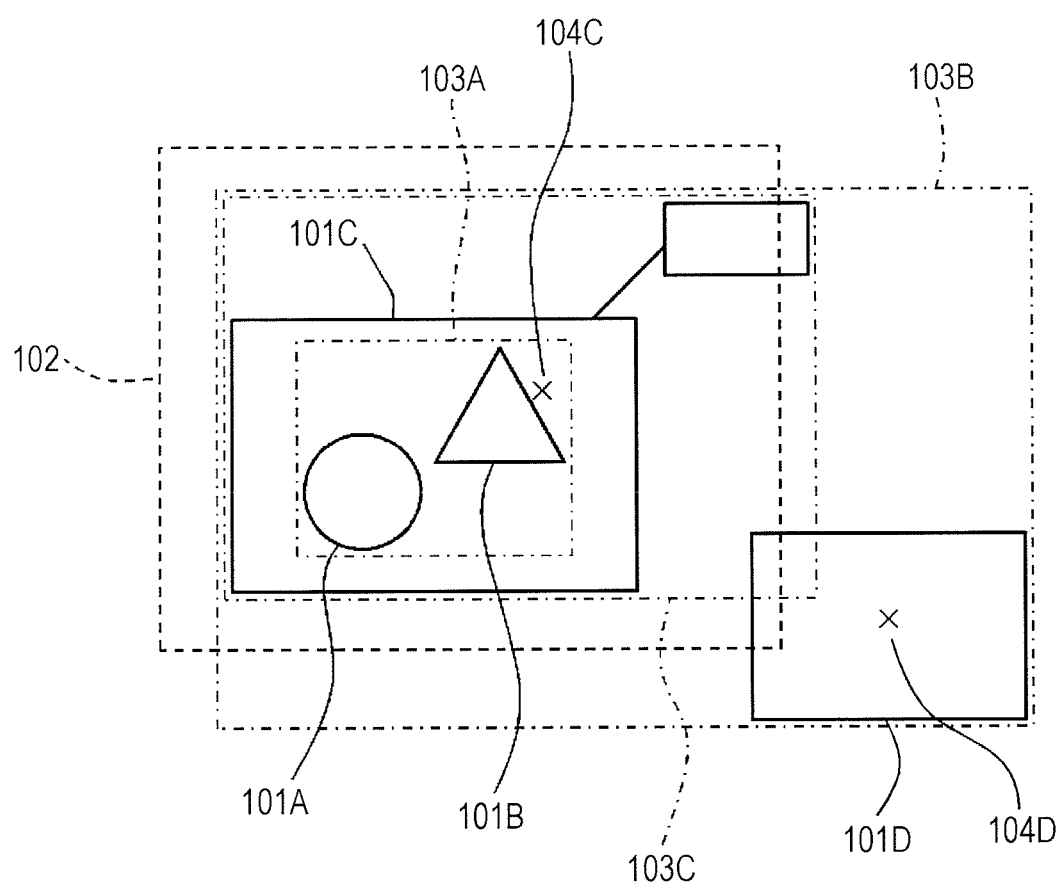
FIG. 3 illustrates a first comparison area that is set on the basis of the relationship between a first specified area and a first specified image.

The approach of setting a first comparison area on the basis of the relationship between the first specified area and the first specified image will be described in more detail with reference to FIG. 3. FIG. 3 illustrates a portion of the first image, including graphical objects 101A, 101B, 101C, and 101D. It is assumed that the first specified area specifying unit 14 has specified a first specified area 102 (whose boundary is indicated by a broken line in FIG. 3). In this case, first, the first comparison area setting unit 12 performs labeling, starting with a first specified image that is an image included in the first specified area 102, and identifies the graphical objects 101A to 101D. Then, the first comparison area setting unit 12 sets a first comparison area using any of the following methods:

(1) Setting the bounding rectangle or convex hull of a graphical object completely included in the first specified area 102 as a first comparison area. In the illustrated example, the graphical objects 101A and 101B are completely included in the first specified area 102, and therefore a first comparison area 103A that is defined as the bounding rectangle of the graphical objects 101A and 101B is set. The first comparison area 103A may be defined as the convex hull, rather than the bounding rectangle, of the graphical objects 101A and 101B although not illustrated in FIG. 3.
(2) Setting the bounding rectangle or convex hull of a graphical object, a portion of which is included in the first specified area 102, as a first comparison area. In the illustrated example, all the graphical objects 101A to 101D are partially included in the first specified area 102, and therefore a first comparison area 103B that is defined as the bounding rectangle of the graphical objects 101A to 101D is set. Also in this case, the first comparison area 103B may be defined as the convex hull rather than the bounding rectangle.
(3) Setting the bounding rectangle or convex hull of a graphical object completely included in the first specified area 102 and a graphical object substantially included in the first specified area 102 as a first comparison area. The term "graphical object substantially included", as used herein, refers to a graphical object that is recognized to be included in the first specified area 102 although a portion of the graphical object is located outside the first specified area 102 due to, for example, an operational error. Conversely, if it is recognized that a certain graphical object is recognized to be outside the first specified area 102 although a portion of the graphical object is located inside the first specified area 102 due to an operational error or the like, the graphical object is not determined to be substantially included. The image processing apparatus 100 may determine, using a variety of methods, whether or not a certain graphical object is substantially included in the first specified area 102. For example, when the center position of the bounding rectangle of a certain graphical object is included in the first specified area 102, it may be determined that the graphical object is substantially included in the first specified area 102. Other methods include determining whether or not a certain graphical object is substantially included in the first specified area 102 on the basis of the position of the center of gravity, instead of the center position of, colored pixels forming the graphical object, and determining whether or not a certain graphical object is substantially included in the first specified area 102 on the basis of the ratio of colored pixels forming the graphical object to the first specified area 102. For example, it may be determined that a certain graphical object is substantially included when 80% or more of colored pixels are included in the first specified area 102. Any of the above methods may be selected arbitrarily or may be selected by a user. Further, in the determination method based on the ratio of colored pixels, a user may set the threshold ratio based on which determination is made.

In the example illustrated in FIG. 3, the graphical objects 101A and 101B are completely included in the first specified area 102, and the graphical objects 101C and 101D are partially included in the first specified area 102. Thus, it is determined whether or not the graphical objects 101C and 101D are substantially included. Since a center position 104C of the graphical object 101C is included in the first specified area 102, it is determined that the graphical object 101C is substantially included in the first specified area 102. However, since a center position 104D of the graphical object 101D is not included in the first specified area 102, the graphical object 101D is not substantially included in the first specified area 102. As a result, a first comparison area 103C that is defined as the bounding rectangle of the graphical objects 101A, 101B, and 101C is set.

The second methods, that is, the methods of setting a first comparison area on the basis of both the first specified area and the second specified area, include:

(1) Setting a first comparison area on the basis of information regarding the shape of the first specified area and information regarding the shape of the second specified area. The information regarding the shapes may include, for example, the lateral widths and longitudinal widths of the respective specified areas. That is, the lateral width and longitudinal width of the first comparison area are set so as to match those of one of the first specified area and the second specified area that has a smaller or larger lateral width. If the first specified area is a rectangle, the first comparison area may be defined as a rectangle having a set lateral width and a set longitudinal width. If the first specified area is not a rectangle, a shape obtained by enlarging or reducing the first specified area so that the lateral width and longitudinal width of the first specified area may become equal to set values may be set as a first comparison area. In this case, the position of the first comparison area is determined so that the first comparison area may have a predetermined relationship with the first specified area. For example, the position of the center of the first comparison area may be made to match the position of the center of the first specified area, or the positions of specific reference points, such as the upper left corners, of the first comparison area and the first specified area may be made to match each other.

(2) Setting a first comparison area by performing logical computation of the first specified area and the second specified area. The term "logical computation", as used herein, means sum or product, and a first comparison area may be defined as the sum set or product set of the first specified area and the second specified area. When logical computation is performed, the positional registration of the first specified area and the second specified area is performed so that the first specified area and the second specified area may have a predetermined relationship. That is, for example, the positions of specific reference points, such as the centers or the upper left corners, of the first specified area and the second specified area may be made to match each other. In this case, specific reference points may be determined by referring to a first specified image and a second specified image.

The method for determining reference points by referring to the first specified image and the second specified image will be described in more detail. In this method, a desired feature point in each of the first specified image and the second specified image is extracted and a specific reference point is determined on the basis of the feature point. A variety of feature points may be available. The term "feature point", as used herein, refers to a point that is extracted from an image and that represents a certain feature of the image. Examples of the feature point include the center of gravity of each specified image (that is, the center of gravity of all the colored pixels included in the specified image, where a colored pixel is a pixel of a color that is not a background color of an image and, for example, a pixel of any color other than white, including black, if the background color is white), and the center or any vertex of the bounding rectangle of each specified image. Alternatively, as described below, a feature point may be determined from the relationship between a specified image and a specified area.

Figure 4A:
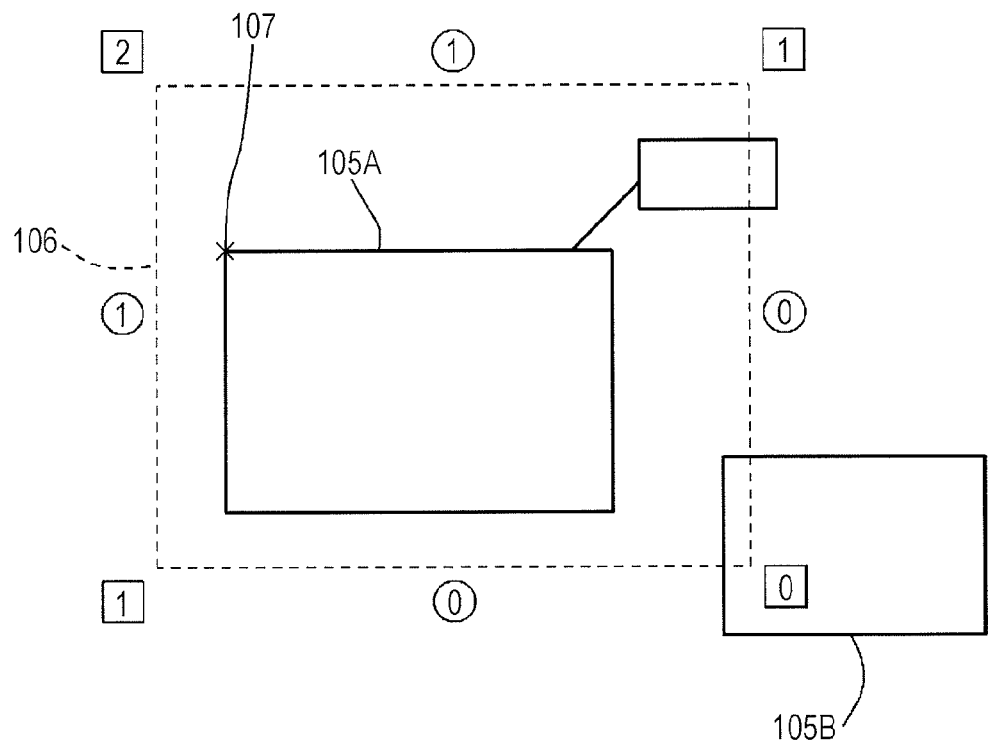
FIG. 4A illustrates a portion of a first image.
Figure 4B:
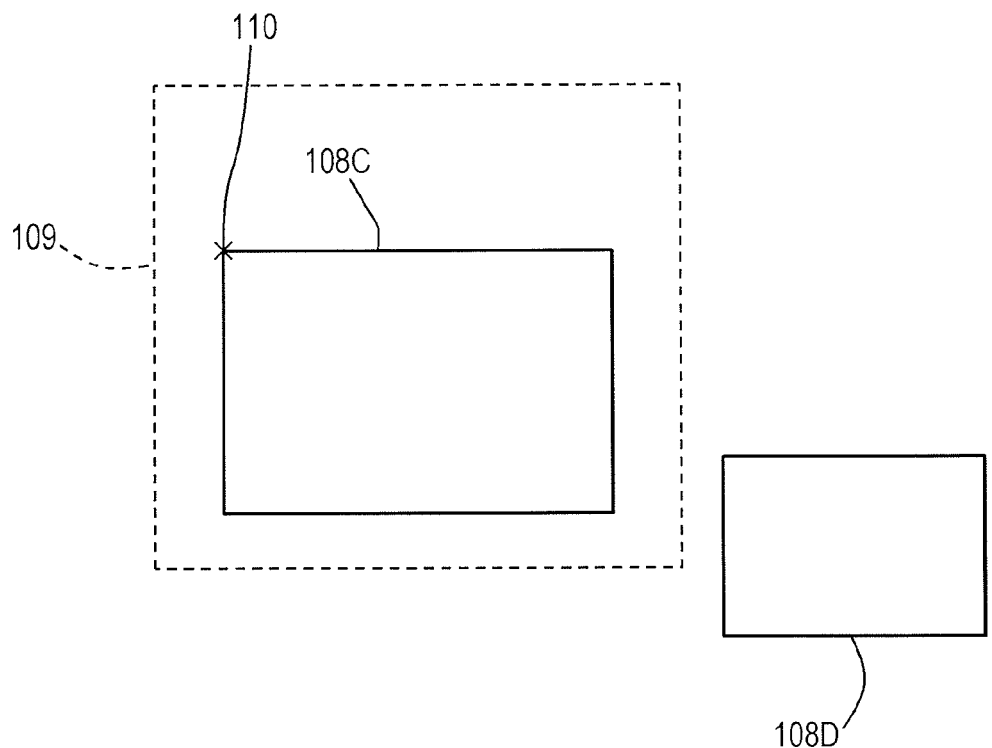
FIG. 4B illustrates a portion of a second image.
Figure 4C:
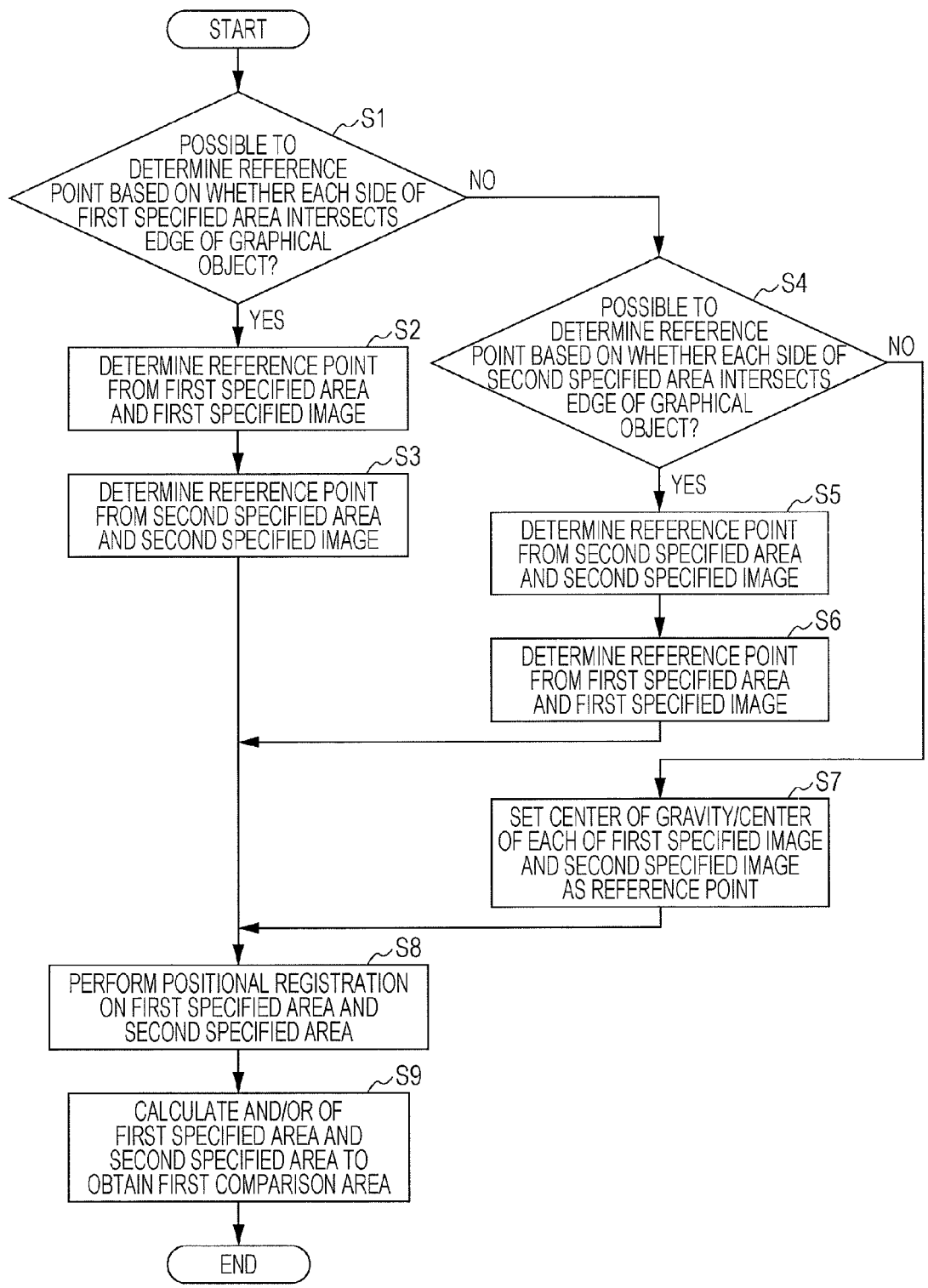
FIG. 4C is a flow diagram illustrating the algorithm of the operation of a first comparison area setting unit.

FIGS. 4A to 4C illustrate an example of a method for determining a feature point from the relationship between a specified image and a specified area. FIG. 4A illustrates a portion of the first image, including graphical objects 105A and 105B, and also illustrates a first specified area 106 specified by the first specified area specifying unit 14.

First, the focus is placed on each of the four sides that define the outer periphery of the first specified area 106, and it is determined whether or not each side intersects the edge of a graphical object, that is, whether or not a colored pixel is located on each side. A side that does not intersect the edge of a graphical object is assigned a value of 1, and a side that intersects the edge of a graphical object is assigned a value of 0 (indicated by encircled numbers in FIG. 4A). In the illustrated example, the upper side and left side of the first specified area 106 do not intersect the edge of a graphical object and are therefore assigned 1, and the lower side intersects the edge of the graphical object 105B and is therefore assigned 0. Further, the right side of the first specified area 106 intersects both the edges of the graphical objects 105A and 105B, and is therefore assigned 0.

Subsequently, the focus is placed on each of the vertices on the outer periphery of the first specified area 106, and the value assigned to the vertex of interest is determined by summing up the values assigned to the sides joining the vertex. For example, the value assigned to the upper left vertex may be determined by summing up the values assigned to the upper side and the left side. In the illustrated example, the upper left vertex is assigned 2, the upper right and lower left vertices are assigned 1, and the lower right vertex is assigned 0 (indicated by numbers enclosed in rectangles in FIG. 4A). The feature point in the first specified image that is the closest to the vertex assigned the largest value is used as a reference point. Examples of the feature points used here include intersections included in graphical objects, and vertices of bounding rectangles. In the illustrated example, intersections included in graphical objects are used by way of example. Thus, an intersection 107 of the graphical object 105A that is the closest to the upper left vertex of the first specified area 106, which is assigned the largest value, i.e., 2, is determined as a reference point.

If the largest value is assigned to plural vertices on the outer periphery of the first specified area 106, a feature point of the specified image that is the closest to any of the vertices may be used as a reference point. Further, if the values assigned to all the vertices are equal (that is, no graphical object overlaps the outer periphery of the first specified area 106, or graphical objects overlap all the sides), as described above, the center of gravity of a specified image or the center of a bounding rectangle may be used as a reference point.

FIG. 4B illustrates a portion of the second image, including graphical objects 108C and 108D, and also illustrates a second specified area 109 specified by the second specified area specifying unit 15. In this case, as described above with reference to FIG. 4A, it has been determined that the feature point of the first specified image that is the closest to the upper left vertex of the first specified area 106 is used as a reference point in the first image. Thus, an intersection 110 serving as a feature point of the second specified image that is the closest to the corresponding vertex of the second specified area 109, that is, the upper left vertex, is determined as a reference point in the second image.

After that, one of the first specified area 106 and the second specified area 109 or both are shifted in parallel so that the reference points, namely, the intersections 107 and 110, may match and the logical sum (OR) or logical product (AND) of both is determined to obtain a first comparison area.

In the foregoing description, a reference point is determined on the basis of whether each of the sides on the outer periphery of the first specified area 106 intersects the edge of a graphical object. Alternatively, a reference point may be determined on the basis of whether each of the sides on the outer periphery of the second specified area 109 intersects the edge of a graphical object. Furthermore, if it is difficult to determine a reference point on the basis of whether each of the sides on the outer periphery of the first specified area 106 intersects the edge of a graphical object, a reference point may be determined on the basis of whether each of the sides on the outer periphery of the second specified area 109 intersects the edge of a graphical object. The algorithm of the operation of the first comparison area setting unit 12 in this case will be described with reference to a flow diagram of FIG. 4C.

First, in step S1, it is determined whether or not it is possible to determine a reference point on the basis of whether each side of the first specified area intersects the edge of a graphical object in the first specified image. In this case, when a side of the first specified area intersects the edge of a graphical object in the first specified image, it may be determined that it is possible to determine a reference point on the basis of whether each side of the first specified area intersects the edge of a graphical object in the first specified image. If the first specified area is a rectangle, when one to three sides of the first specified area intersect the edge of a graphical object, it may be determined that it is possible to determine a reference point on the basis of whether each side of the first specified area intersects the edge of a graphical object in the first specified image. On the other hand, when none of the sides of the first specified area intersects the edge of a graphical object or all the sides of the first specified area intersect the edges of graphical objects, it may be determined that it is difficult to determine a reference point on the basis of whether each side of the first specified area intersects the edge of a graphical object in the first specified image.

If it is possible to determine a reference point on the basis of whether each side of the first specified area intersects the edge of a graphical object in the first specified image, the process proceeds to step S2. In step S2, a reference point is determined from the first specified area and the first specified image, using the method described above with reference to FIG. 4A. Then, in step S3, a reference point is determined from the second specified area and the second specified image, using the method described above with reference to FIG. 4B. After reference points are determined for both the first specified area and the second specified area, the process proceeds to step S8.

If it is determined in step S1 that it is difficult to determine a reference point on the basis of whether each side of the first specified area intersects the edge of a graphical object in the first specified image, the process proceeds to step S4. In step S4, it is determined whether or not it is possible to determine a reference point on the basis of whether each side of the second specified area intersects the edge of a graphical object in the second specified image. If it is possible to determine a reference point on the basis of whether each side of the second specified area intersects the edge of a graphical object in the second specified image, the process proceeds to step S5. In step S5, a reference point is determined from the second specified area and the second specified image. In this case, the method described with reference to FIG. 4A may be applied to the second specified area and the second specified image. Then, in step S6, a reference point is determined from the first specified area and the first specified image. In this case, the method described with reference to FIG. 4B may be applied to the first specified area and the first specified image. After reference points are determined for both the first specified area and the second specified area, the process proceeds to step S8.

If it is determined in step S4 that it is difficult to determine a reference point on the basis of whether each side of the second specified area intersects the edge of a graphical object in the second specified image, the process proceeds to step S7. In step S7, the center of gravity or the center of the bounding rectangle of each of the first specified image and the second specified image is determined and is set as a reference point. Then, the process proceeds to step S8.

In step S8, positional registration is performed on the first specified area and the second specified area so that the reference points of the first specified area and the second specified area may match. Then, in step S9, the OR or AND of the first specified area and the second specified area is calculated to determine the sum set or product set of the first specified area and the second specified area to obtain a first comparison area.

The algorithm described here is merely an example of a method for determining a feature point from the relationship between a specified image and a specified area. The basic idea is that a graphical object whose edge intersects the outer periphery of the first specified area 106 (or the second specified area 109) or a portion that intersects the outer periphery of the first specified area 106 (or the second specified area 109) is likely to be a graphical object or portion added to or deleted from the second image (or the first image) or is likely to have no relationship with a portion to be compared by the user, and therefore a position away from such an intersecting portion is set as a reference point. Any algorithm other than that described above for providing a reference point at a position away from a portion where the outer periphery of a specified area intersects the edge of a graphical object may be employed.

Referring back to FIG. 1, the second comparison area setting unit 13 is configured to set a second comparison area. There are a variety of setting methods, and the operation of the second comparison area setting unit 13 differs depending on how the first comparison area setting unit 12 sets a first comparison area.

First, if the first comparison area setting unit 12 is configured to set a first comparison area on the basis of only the first specified area (including the first specified image), the second comparison area setting unit 13 may also be configured to set a second comparison area on the basis of only the second specified area (including the second specified image). In this case, a second comparison area may be set by applying the method used for the first image, which has been described with respect to the first comparison area setting unit 12, to the second image, and the method for setting the second comparison area will not be redundantly described herein. In general, preferably, the second comparison area setting unit 13 employs the same or substantially the same method as that which the first comparison area setting unit 12 employs.

If the first comparison area setting unit 12 is configured to set a first comparison area on the basis of both the first specified area and the second specified area, preferably, the second comparison area has the same or substantially the same shape as the first comparison area. Of course, the second comparison area setting unit 13 may perform processing similar to the processing performed by the first comparison area setting unit 12. However, because of the same result or substantially the same result being generally obtained, the second comparison area is set so as to have the same shape or substantially the same shape as the first comparison area obtained as a result by the first comparison area setting unit 12, thus reducing the information processing load (in this case, information may be exchanged in the manner indicated by a broken line in FIG. 1). In this case, the position of the second comparison area may be determined using, as a reference, a point in the second image corresponding to the point in the first image which is used as a reference to set the first comparison area. For example, if the first comparison area has been set by referring to the center of gravity or the center of a bounding rectangle of the first comparison image, or by referring to a certain vertex of the first comparison image, a second comparison area is also set by using the shape of the first comparison area and by using, as a reference, the center of gravity or the center of a bounding rectangle of the second comparison image or the corresponding vertex of the second comparison image. Further, if a reference point is also determined for the second image when a first comparison area is set, a second comparison area may be set by using the shape of the first comparison area and by using the determined point as a reference.

The first image, the second image, the first comparison area, and the second comparison area are delivered to a geometric difference correction unit 16. The geometric difference correction unit 16 is a unit that corrects a difference in geometric properties between the first comparison image in the first comparison area and the second comparison image in the second comparison area. The portions of the first image and the second image that the user wishes to compare do not necessarily have equal geometric properties such as image scale and inclination. If the first image and the second image are obtained by scanning images recorded on paper media, the inclinations of the first image and the second image are not exactly the same. Further, if the first image and the second image are output in different situations, the image scales may slightly differ. Moreover, if a portion of the first image is used in the second image that is a different image from the first image, the positions of the corresponding portions in the images may differ accordingly. The term "geometric properties", as used herein, means the position, inclination, and scale of a portion common to the first comparison image included in the first comparison area of the first image and the second comparison image included in the second comparison area of the second image, which are to be compared. The term "correcting a difference in geometric properties", as used herein, means making the geometric properties of the first comparison image in the first image and the second comparison image in the second image match. The difference in geometric properties between the first comparison image and the second comparison image may be corrected so that the geometric properties of the second comparison image may match those of the first comparison image, or vice versa. The correction may be made using known coordinate transformation, for example, affine transformation.

The geometric difference correction unit 16 includes a rough correction unit 17 and a detailed correction unit 18. The rough correction unit 17 is configured to perform correction so that the geometric properties of the first comparison image and the second comparison image may roughly match (hereinafter referred to as "rough correction"). The detailed correction unit 18 is configured to perform correction so that the geometric properties of the first comparison image and the second comparison image may match more closely (hereinafter referred to as "detailed correction") than in the case of the rough correction unit 17.

The rough correction unit 17 performs rough correction in advance so that the following detailed correction unit 18 may perform detailed correction for the geometric properties of the first comparison image and the second comparison image. In this manner, the geometric difference correction unit 16 is divided into two parts, i.e., the rough correction unit 17 and the detailed correction unit 18, because of the following reason: Direct detailed correction without rough correction performed by the rough correction unit 17 may cause a larger information processing load than that with the intervention of rough correction, leading to a reduction in processing speed and a reduction in use efficiency of the calculation resources of the image processing apparatus 100.

There are a variety of rough correction methods performed by the rough correction unit 17, and one or plural methods among the following methods may be employed. Alternatively, any other method may be employed, or a user may select which method to use.

First, a description will be given of a method for roughly correcting the difference in geometric properties between the first comparison image and the second comparison image on the basis of both the first comparison area and the second comparison area. In other words, this method may be a rough correction method performed using only the features of the first comparison area and the second comparison area without referring to the first comparison image included in the first comparison area or the second comparison image included in the second comparison area. The above method includes the following approaches:

(1) Making the positions of any corresponding vertices, for example, the upper left vertices, of bounding rectangles of the first comparison area and the second comparison area match. If the first comparison area and the second comparison area are rectangles, the positions of any corresponding vertices of the rectangles may be made to match.

(2) Making the positions of the centers of the first comparison area and the second comparison area match. If the first comparison area and the second comparison area are not rectangles, the center positions of bounding rectangles of the first comparison area and the second comparison area may be used as the center positions of the first comparison area and the second comparison area.

(3) Making the positions of the centers of gravity of the first comparison area and the second comparison area match. If the first comparison area and the second comparison area are rectangles, the positions of the centers of gravity of the rectangles match the positions of the centers described above.

The above method provides reduced information processing load and increased processing speed. However, the method only allows rough correction for any misregistration between the positions of the first comparison area and the second comparison area, and does not allow rotation or scaling correction.

Subsequently, a description will be given of a method for roughly correcting the difference in geometric properties between the first comparison image and the second comparison image on the basis of both the first comparison image and the second comparison image. In other words, this method may be a method for performing rough correction on the first comparison area and the second comparison area by referring to the first comparison image included in the first comparison area and the second comparison image included in the second comparison area. The above method includes the following approaches:

(1) Performing rough correction using the feature values of the first comparison image and the second comparison image. A feature value is a value extracted from an image and indicating a certain feature of the image (including a vector value). The feature point described above is one of the feature values. For example, if a feature point is used as a feature value, the centers of gravity of both comparison images (that is, the centers of gravity of all the pixels included in the comparison images) are used, and the comparison images are shifted in parallel so that the centers of gravity of both comparison images may match. Alternatively, the positions of the comparison images that are the closest to desired corresponding vertices of the comparison areas may be used, and the comparison images may be shifted in parallel so that both comparison images may match. For example, the first comparison image and the second comparison image may be shifted in parallel so that points in the comparison images that are the closest to the upper left vertices of the comparison areas (if the comparison areas are rectangles) (these points may be the uppermost and leftmost points in the colored pixels included in the comparison images) may match. Alternatively, if the first comparison area setting unit 12 and the second comparison area setting unit 13 are configured to individually define reference points used as references to set the first comparison area and the second comparison area, respectively, the reference points may be used as feature points, and the first comparison image and the second comparison image may be shifted in parallel so that the feature points of the first comparison image and the second comparison image may match. Furthermore, the longest lines included in the first comparison image and the second comparison image may be extracted, and mapping may be performed so that the positions, lengths, and inclinations of the lines in the first comparison image and the second comparison image may match. In this case, the lines may be extracted by using, for example, the Hough transform. As described above, mapping may be performed using affine transformation. The object from which the feature value is to be extracted may include at least the first comparison image or the second comparison image. That is, for example, when the Hough transform described above is applied to the first comparison image, the Hough transform may be applied to only the first comparison image, or may be applied to an image in a predetermined range including the first comparison area or to the entire first image. If a feature value is to be extracted only from a comparison image, small information processing load and high information processing speed may be expected, whereas if a feature point is to be extracted from a wider range, the information processing load may increase but more accurate rough correction may be expected.

(2) Performing rough correction using bounding rectangles of the first comparison image and the second comparison image. In order to achieve positional correction, the first comparison image and the second comparison image may be shifted in parallel so that any corresponding vertices or center positions of the bounding rectangles may match. If the aspect ratios (ratios of the longitudinal length to the lateral length) of the bounding rectangles of the first comparison image and the second comparison image match or are substantially equal (if the aspect ratios are within a predetermined error range such as plus or minus 5%), it is determined that no changes have been made to the first comparison image and the second comparison image to change the sizes of the images, and the first comparison image or the second comparison image may be enlarged or reduced so that the sizes of the bounding rectangles may match. The above operations, i.e., shifting in parallel and enlarging or reducing, may be performed using affine transformation.

(3) Performing the pattern matching between the first comparison image and the second comparison image to perform rough correction on both comparison images. In this case, simple pattern matching may increase the information processing load. Therefore, preferably, pre-processing such as reducing the resolution and performing the fill processing on a closed area in an image is performed on each of the first comparison image and the second comparison image, and then pattern matching is performed.

The above methods may cause larger information processing load than the method described above for roughly correcting the difference in geometric properties between the first comparison image and the second comparison image on the basis of both the first comparison area and the second comparison area. However, since the first comparison image and the second comparison image are referred to, more accurate rough correction may be achieved.

The first comparison image and the second comparison image subjected to rough correction are further delivered to the detailed correction unit 18. The detailed correction unit 18 finely corrects the geometric properties of the first comparison image and the second comparison image. The detailed correction may be performed using any known method, for example, using arbitrary feature values of the first comparison image and the second comparison image or by performing pattern matching.

The first comparison image and the second comparison image subjected to detailed correction are delivered to a difference extraction unit 19. The difference extraction unit 19 extracts the difference between the first comparison image and the second comparison image. Specifically, the difference extraction unit 19 extracts, as a difference, a colored pixel (hereinafter referred to as a "deleted pixel" for convenience) that is present in the first comparison image but is not present in the second comparison image and a colored pixel (hereinafter referred to as an "added pixel" for convenience) that is not present in the first comparison image but is present in the second comparison image.

The extracted difference, the first image, and the second image are delivered to an image output unit 20. The image output unit 20 is a unit that outputs an image in which the second comparison image is superimposed on the first comparison image or a difference image between the first comparison image and the second comparison image. In this exemplary embodiment, by way of example, the image output unit 20 outputs a difference image between the first comparison image and the second comparison image. In this exemplary embodiment, the image output unit 20 is configured to output an image that has been subjected to superimposition so that a deleted pixel and an added pixel may be identified on the first image in which the colored pixels are modified into light-color pixels (so-called grayed-out image) and so that the colors of the colored pixels that do not change between the first comparison image and the second comparison image remain. The image output unit 20 may physically have any configuration capable of visually presenting an image including a difference (difference image) to the users. For example, an image may be output as an optical image on the monitor 8 (see FIG. 2), printed using a printer, output to another computer using a desired file format, or recorded on a desired information recording medium such as a hard disk drive (HDD).

In the image processing apparatus 100 according to this exemplary embodiment, the image output unit 20 is configured to output a difference image. Instead of the above configuration, the image output unit 20 may be configured to output an image in which the first comparison image and the second comparison image are simply superimposed on one another. In this case, the difference extraction unit 19 is unnecessary and may be omitted. Further, when the first comparison image and the second comparison image are superimposed on one another, the colors of the first comparison image and the second comparison image may be made different so as to be distinguishable from each other. Additionally, when a difference image between the first comparison image and the second comparison image or an image in which the first comparison image and the second comparison image are superimposed on one another is output, the overall first image or second image may not necessarily be presented but only the first comparison image and the second comparison image or only portions thereof including portions peripheral to predetermined ranges may be output.

In this exemplary embodiment, the first comparison area setting unit 12 and the second comparison area setting unit 13 are separate units that perform processing on the first image and the second image, respectively, and the first specified area specifying unit 14 and the second specified area specifying unit 15 are separate units that perform processing on the first image and the second image, respectively, for convenience of explanation. The first comparison area setting unit 12 and the second comparison area setting unit 13 may be identical, and the first specified area specifying unit 14 and the second specified area specifying unit 15 may be identical. Specifically, if the first comparison area setting unit 12 and the second comparison area setting unit 13 or the first specified area specifying unit 14 and the second specified area specifying unit 15 receive different images but have the same or substantially the same functions, they may be identical, and may serve as the first comparison area setting unit 12 or the first specified area specifying unit 14 if the first image is received, and serve as the second comparison area setting unit 13 or the second specified area specifying unit 15 if the second image is received.

The image processing apparatus 100 according to this exemplary embodiment described above is configured to set a first comparison area and a second comparison area and to then perform rough correction. The operations may be reordered, and rough correction, followed by setting a first comparison area and a second comparison area, may be performed.

Figure 5:
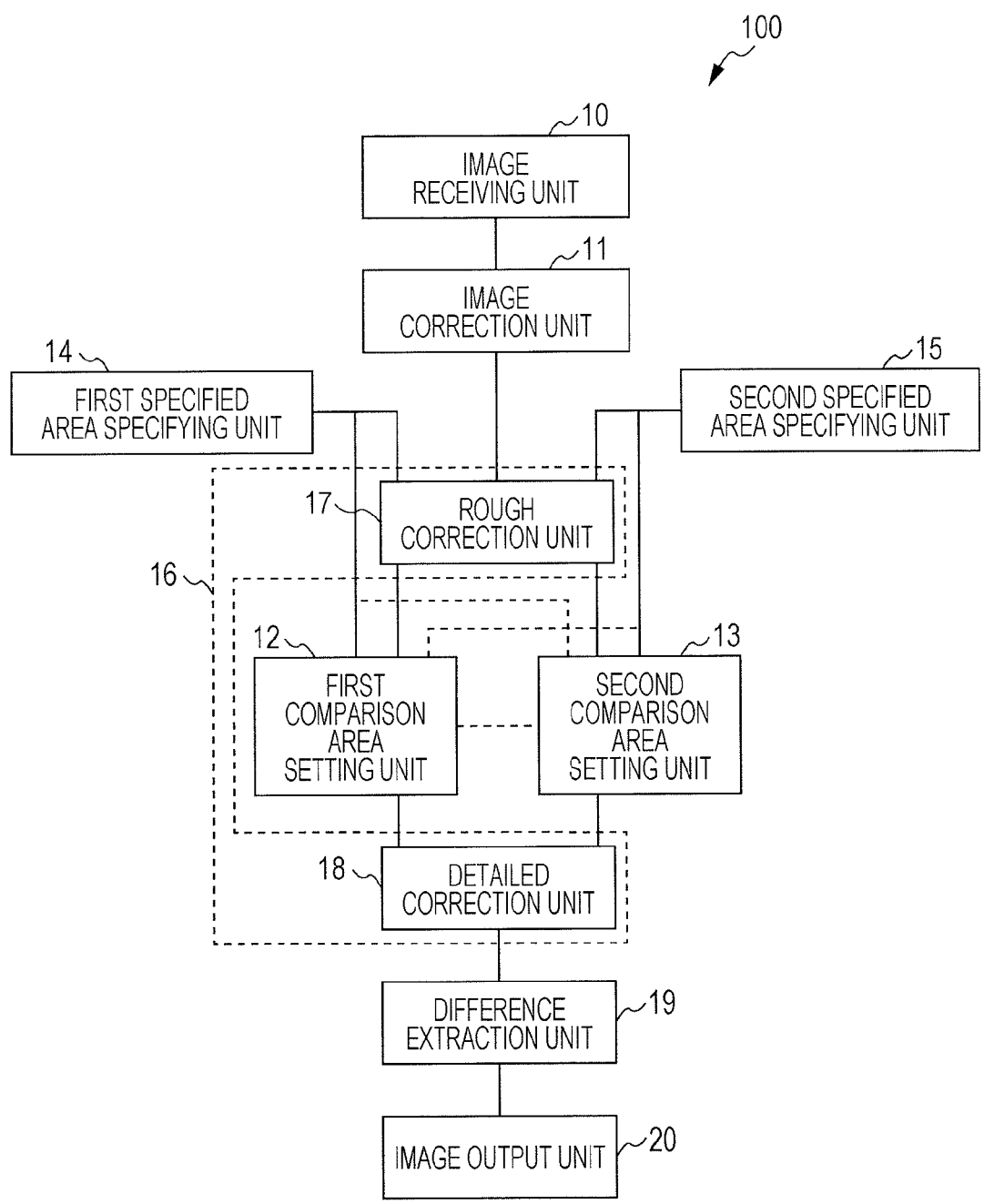
FIG. 5 is a functional block diagram of an image processing apparatus according to a modification of the first exemplary embodiment in which a first comparison area and a second comparison area are set after rough correction is performed.

FIG. 5 is a functional block diagram of an image processing apparatus 100 according to a modification of this exemplary embodiment in which a first comparison area and a second comparison area are set after rough correction is performed. In this case, as illustrated in FIG. 5, the rough correction unit 17 is placed before the first comparison area setting unit 12 and the second comparison area setting unit 13. Further, information is delivered from the first specified area specifying unit 14 and the second specified area specifying unit 15 to the rough correction unit 17 so that the rough correction unit 17 may refer to the first specified area and the second specified area.

Also in this modification, the functions of the rough correction unit 17, the first comparison area setting unit 12, and the second comparison area setting unit 13 are similar to those described above. In this case, however, the rough correction unit 17 is not allowed to utilize the first comparison area, the first comparison image, the second comparison area, and the second comparison image. Instead, the rough correction unit 17 utilizes the first specified area, the first specified image, the second specified area, and the second specified image. Further, if the first comparison area setting unit 12 is configured to perform logical computation of the first specified area and the second specified area, positional registration may be performed on the first specified area and the second specified area by using rough correction performed by the rough correction unit 17. It is to be understood that reference points in the respective areas may be determined separately using the method described above, and positional registration may be performed independently.

Next, a specific example of the process of the image processing apparatus 100 according to this exemplary embodiment will be described with reference to FIGS. 1 and 6 to 10. The following description will be given in the context of the image processing apparatus 100 described with reference to FIG. 1, rather than that in the modification described with reference to FIG. 5.

Figure 6:
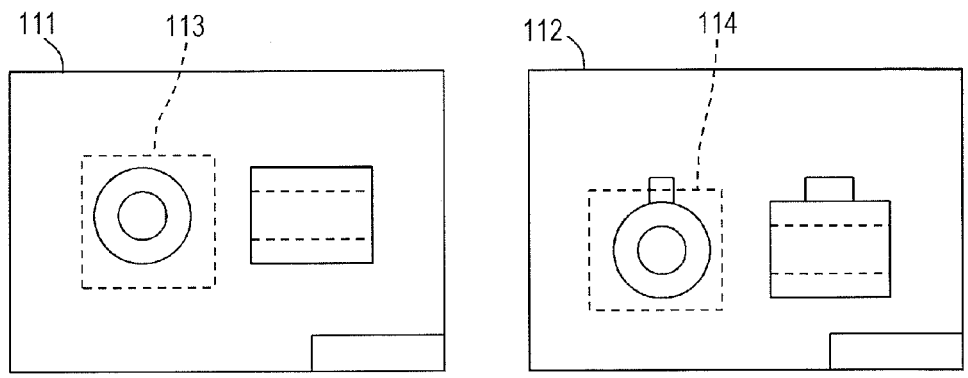
FIG. 6 illustrates a specific example of the process of the image processing apparatus according to the first exemplary embodiment.

FIG. 6 illustrates a first image 111 and a second image 112. It is assumed that the first specified area specifying unit 14 has specified a first specified area 113 (indicated by a broken line), and the second specified area specifying unit 15 has specified a second specified area 114 (indicated by a broken line).

Figure 7:
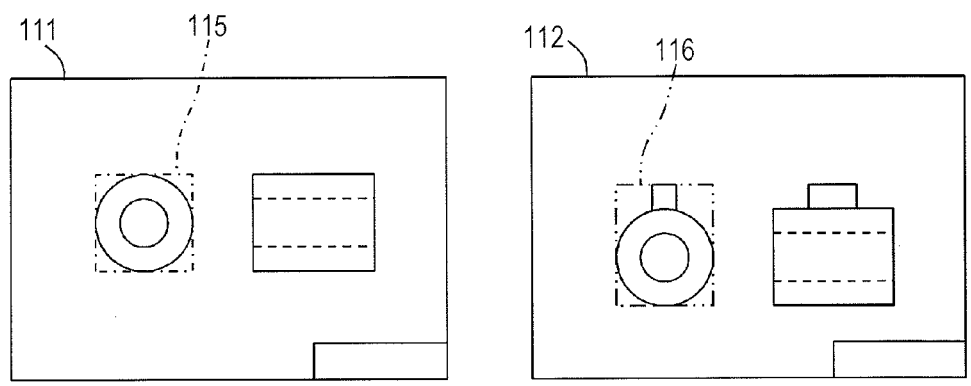
FIG. 7 illustrates a specific example of the process of the image processing apparatus according to the first exemplary embodiment.

In the illustrated example, the first specified area specifying unit 14 and the second specified area specifying unit 15 are configured to allow a user to specify a rectangle. Further, the first comparison area setting unit 12 and the second comparison area setting unit 13 are designed to set bounding rectangles of the first specified image and the second specified image as a first comparison area and a second comparison area, respectively. Thus, as illustrated in FIG. 7, a first comparison area 115 (indicated by a one-dot chain line) and a second comparison area 116 (indicated by a two-dot chain line) are set so as to correspond to bounding rectangles of a first specified image and a second specified image, respectively.

Figure 8:
FIG. 8 illustrates a specific example of the process of the image processing apparatus according to the first exemplary embodiment.

Then, as illustrated in FIG. 8, the rough correction unit 17 performs rough correction so that, in the illustrated example, the positions of the centers of gravity of the first comparison image and the second comparison image may match, thereby performing rough positional registration of both images.

Figure 9:
FIG. 9 illustrates a specific example of the process of the image processing apparatus according to the first exemplary embodiment.

Subsequently, as illustrated in FIG. 9, the detailed correction unit 18 performs fine positional registration. In the illustrated example, positional registration is performed using pattern matching. Thus, positional registration may be performed so that concentric circles commonly included in the first comparison image and the second comparison image may overlap.

Figure 10:
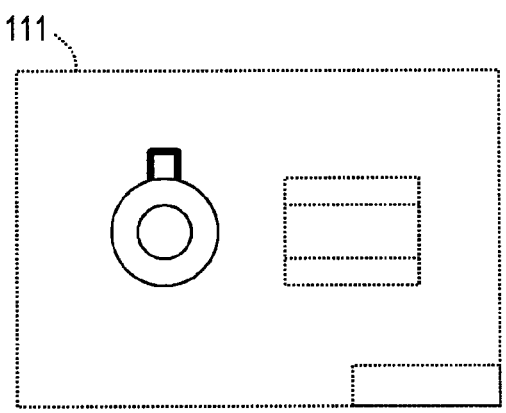
FIG. 10 illustrates a specific example of the process of the image processing apparatus according to the first exemplary embodiment.

Then, the difference between the first comparison image and the second comparison image is extracted by the difference extraction unit 19, and, as illustrated in FIG. 10, the difference is output from the image output unit 20. In the illustrated example, the resulting image is displayed on the monitor 8 so that a portion extracted as the difference is indicated by a thick line, a common portion in the portions to be compared (that is, the first comparison image and the second comparison image) is indicated by a solid line, and other portions in the first image are grayed out (indicated by a dotted line in FIG. 10). The individual portions may be distinctly indicated in any desired fashion by, as described above, changing colors or brightnesses or flashing or blinking lights. Alternatively, only the portions to be compared, that is, only the portions indicated by the thick line and the solid line in FIG. 10, may be output.

Figure 11:
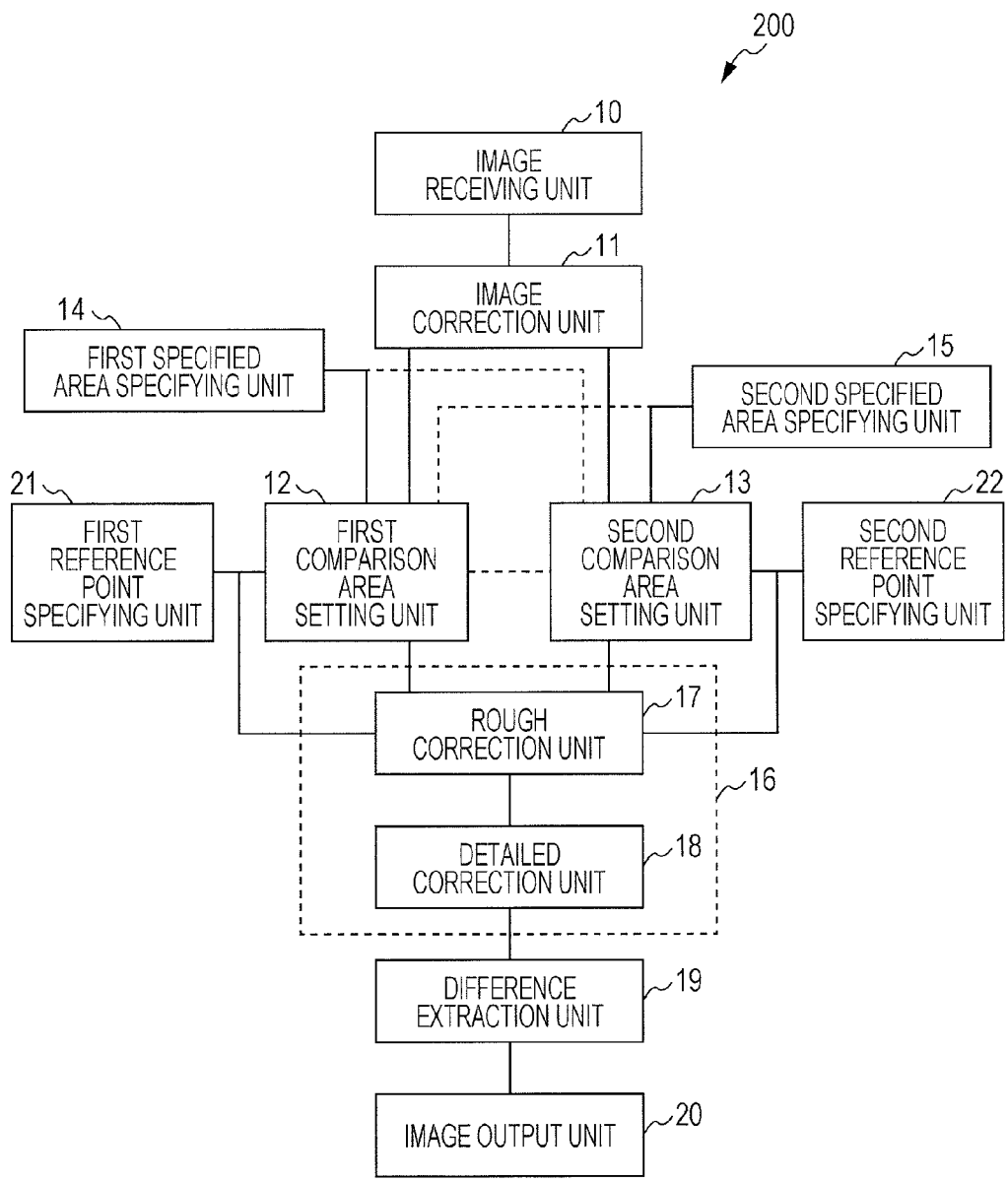
FIG. 11 is a functional block diagram of an image processing apparatus according to a second exemplary embodiment of the present invention.

Next, a second exemplary embodiment of the present invention will be described. FIG. 11 is a functional block diagram of an image processing apparatus 200 according to the second exemplary embodiment of the present invention. The image processing apparatus 200 according to this exemplary embodiment is different from the image processing apparatus 100 according to the first exemplary embodiment in that it further includes a first reference point specifying unit 21 and a second reference point specifying unit 22.

In the image processing apparatus 200, the functions of an image receiving unit 10, an image correction unit 11, a first specified area specifying unit 14, and a second specified area specifying unit 15 are similar to those in the image processing apparatus 100 according to the first exemplary embodiment. The first reference point specifying unit 21 receives an input first reference point specified by a user in the first image. The first reference point specifying unit 21 is a unit that allows a user to specify a first reference point in the first image. The second reference point specifying unit 22 is a unit that receives an input second reference point specified by the user in the second image. The second reference point specifying unit 22 is a unit that allows a user to specify a second reference point in the second image.

The first reference point and the second reference point are used to allow a user to clearly specify the correspondence between positions when the user compares corresponding portions in the first image and the second image. When the first image and the second image are shifted in parallel so that the position indicated by the first reference point in the first image and the position indicated by the second reference point in the second image may match, the positions of the corresponding portions in the first image and the second image to be compared by the user may be made to substantially match.

The first reference point specifying unit 21 and the second reference point specifying unit 22 may have any specific configuration that allows a user to input a first reference point and a second reference point. For example, the first reference point specifying unit 21 and the second reference point specifying unit 22 may be configured to allow a user to specify a desired position in the first image or the second image displayed on the monitor 8 (see FIG. 2) using the input device 5 (see FIG. 2) such as a mouse or a touch panel. Alternatively, the first reference point specifying unit 21 and the second reference point specifying unit 22 may be configured to allow a user to write in advance a desired position using a marker pen or the like on a paper medium on which the first image or the second image is recorded and to specify the desired position by recognizing it from the first image or second image read by the image receiving unit 10.

There are a variety of methods by which the correspondence between the portions in the first image and the second image clearly indicated by the first reference point and the second reference point, respectively, is used in the subsequent processing, and one or plural method among the following methods may be employed. Alternatively, any other method may be employed, or a user may select which method to use.

(1) If the first comparison area setting unit 12 is configured to determine a first comparison area by performing logical computation of the first specified area and the second specified area, the first reference point and the second reference point are used as reference points based on which positional registration of the first specified area and the second specified area is performed.

(2) If the rough correction unit 17 performs rough correction using a feature point as a feature value, the first reference point and the second reference point are used as the feature points of the first image and the second image, respectively, to perform rough correction.

As in this exemplary embodiment, furthermore, if the second reference point specifying unit 22 is configured to allow a user to specify a second reference point in the second image, the second reference point specifying unit 22 may also serve as the second specified area specifying unit 15. In this case, the second reference point specifying unit 22 specifies a second reference point, thereby also specifying a second specified area. That is, the second reference point specifying unit 22 may determine a second specified area based on a second reference point by using a first specified area specified using the first specified area specifying unit 14 and a first reference point specified using the first reference point specifying unit 21. Specifically, with respect to the second reference point, an area having a position and shape equivalent to the position and shape of the first specified area with respect to the first reference point is set as a second specified area. Thus, the load on the user who specifies a second specified area may be reduced.

The configuration and functions of a first comparison area setting unit 12, a second comparison area setting unit 13, a rough correction unit 17, a detailed correction unit 18, a difference extraction unit 19, and an image output unit 20 are similar to those in the image processing apparatus 100 according to the first exemplary embodiment. An image output unit 20 outputs an image in which the second comparison image is superimposed on the first comparison image or a difference image between the first comparison image and the second comparison image.

Next, a specific example of the process of the image processing apparatus 200 according to this exemplary embodiment will be described with reference to FIGS. 11 to 14.

Figure 12:
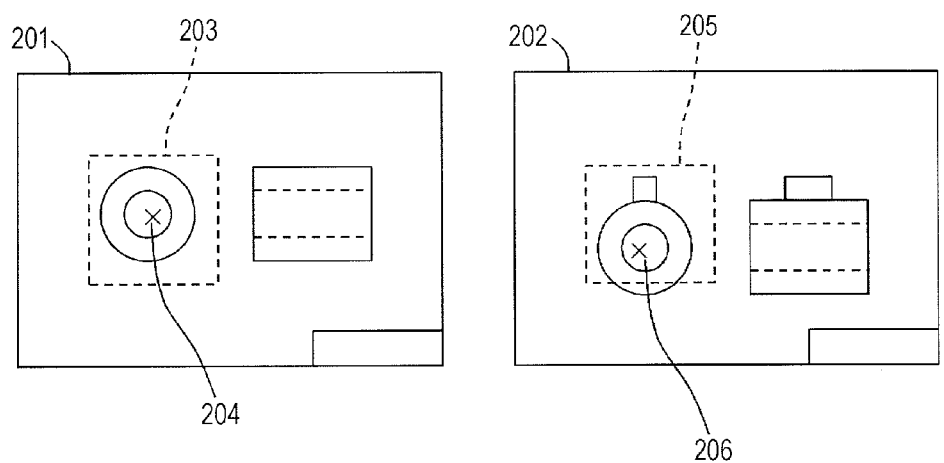
FIG. 12 illustrates a specific example of the process of the image processing apparatus according to the second exemplary embodiment.

FIG. 12 illustrates a first image 201 and a second image 202. It is assumed that the first specified area specifying unit 14 has specified a first specified area 203 (indicated by a broken line), and the first reference point specifying unit 21 has specified a first reference point 204. It is also assumed that the second specified area specifying unit 15 has specified a second specified area 205 (indicated by a broken line), and the second reference point specifying unit 22 has specified a second reference point 206.

Figure 13:
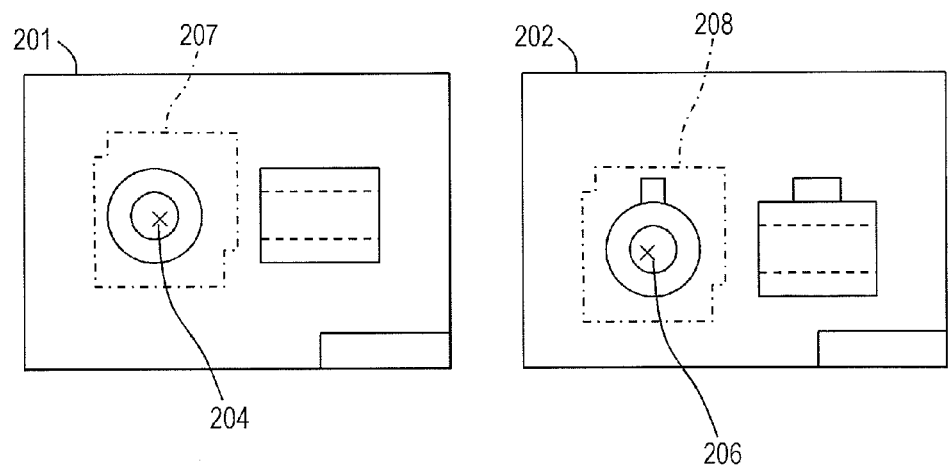
FIG. 13 illustrates a specific example of the process of the image processing apparatus according to the second exemplary embodiment.

Then, as illustrated in FIG. 13, the first comparison area setting unit 12 makes the first specified area 203 and the second specified area 205 overlap so that the first reference point 204 and the second reference point 206 may match, and calculates the logical computation, namely, OR, of the first specified area 203 and the second specified area 205 to set a first comparison area 207 (indicated by a one-dot chain line) in the first image 201. The second comparison area setting unit 13 sets a second comparison area 208 having the same shape as the first comparison area 207 in the second image 202 on the basis of the position of the second reference point 206.

Figure 14:
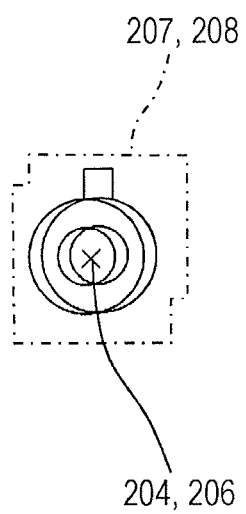
FIG. 14 illustrates a specific example of the process of the image processing apparatus according to the second exemplary embodiment.

Then, as illustrated in FIG. 14, the rough correction unit 17 performs rough correction so that, in the illustrated example, the positions of the first reference point 204 and the second reference point 206 may match, thereby performing rough positional registration of the first reference point 204 and the second reference point 206.

The subsequently processes of the detailed correction unit 18, the difference extraction unit 19, and the image output unit 20 are similar to those in the specific example of the first exemplary embodiment described with reference to FIGS. 9 and 10, and a redundant description thereof is thus omitted.

Figure 15:
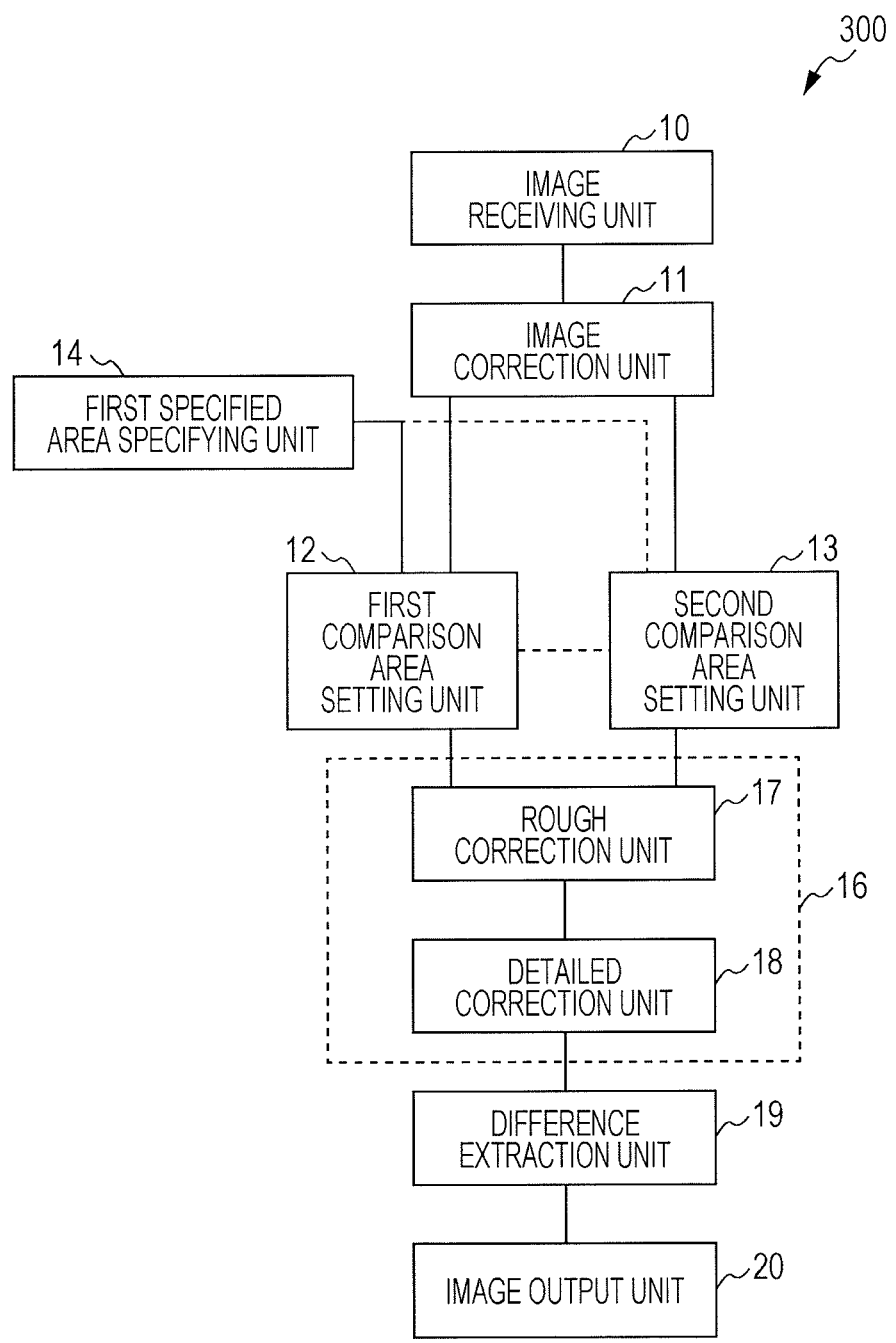
FIG. 15 is a functional block diagram of an image processing apparatus according to a third exemplary embodiment of the present invention.

A third exemplary embodiment of the present invention will further be described. FIG. 15 is a functional block diagram of an image processing apparatus 300 according to the third exemplary embodiment of the present invention. The image processing apparatus 300 according to this exemplary embodiment is different from the image processing apparatus 100 according to the first exemplary embodiment in that it does not include the second specified area specifying unit 15.

In the image processing apparatus 300, the functions of an image receiving unit 10, an image correction unit 11, a first specified area specifying unit 14, and a first comparison area setting unit 12 are similar to those in the image processing apparatus 100 according to the first exemplary embodiment. In the image processing apparatus 300 according to this exemplary embodiment, as described above, no second specified area specifying unit is provided. Thus, a second comparison area is set on the basis of a first specified area or a first comparison area rather than on the basis of a second specified area specified by a user.

Specifically, in this exemplary embodiment, the second comparison area setting unit 13 searches the second image for an image corresponding to an image (that is, the first specified image or the first comparison image) included in the first specified area or the first comparison area to determine an area in the second image corresponding to the first specified area or the first comparison area, and sets a second comparison area. For example, if the first comparison image is used, an image similar to the first comparison image is searched for through the second image. The search may be made using any of a variety of methods. In this exemplary embodiment, a similar image may be searched for using a pattern matching technique. Alternatively, for example, after the labeling process is performed on a graphical object included in the first specified area or the first comparison area and a graphical object included in the second image, the feature values of the graphical objects, for example, the ratios of the longitudinal length to the lateral length of bounding rectangles, the sizes, the number of colored pixels, and the number or arrangement of intersections, may be compared to determine a similar graphical object, and a similar image may be searched for accordingly. Then, a second comparison area is set on the basis of the image found as a result of the search. In this case, the second comparison area may be set so that the position and shape of the found image may be equivalent to the position and shape of the first comparison area in the first comparison image. Alternatively, if the first specified image is used, an area set on the basis of the found image may be set as the second comparison area, or a first comparison area and a second comparison area may be individually set by using the first specified image as the first specified area in the foregoing exemplary embodiment.

If plural similar image candidates are found in the second image as a result of the search, the similar image candidate having the highest degree of similarity, such as the highest ratio of common colored pixels, may be used, or a user may specify one of the plural similar image candidates. In this case, if plural second comparison area candidates are obtained, a user specifies one of the plural second comparison area candidates to set a second comparison area. The user may be notified of the second comparison area candidates by displaying a second image on, for example, the monitor 8 (see FIG. 2) and displaying the image portions corresponding to the candidates in the second image in a distinguishable manner such as by highlighting the portions, flashing or blinking lights, or displaying the outer edge of the second comparison area that will be set on the basis of the portions, and the user may select one of the candidates using the desired input device 5 (see FIG. 2).

In this case, the number of image candidates the user is notified of for selection may be arbitrarily set. For example, the upper limit number of (for example, five) image candidates to be displayed may be determined, and up to the upper limit number of image candidates may be displayed for selection, in order starting from the image candidate having the highest degree of similarity. Alternatively, a threshold value of degree of similarity for the image candidates may be provided, and an image candidate having a higher degree of similarity than the threshold value may be displayed for selection. The threshold value may be a predetermined value or may be arbitrarily set by a user. If an image candidate whose degree of similarity reaches the threshold value is not obtained, as in the image processing apparatus 100 according to the first exemplary embodiment or the image processing apparatus 200 according to the second exemplary embodiment, a user may specify a second specified area.

The configuration and functions of a rough correction unit 17, a detailed correction unit 18, a difference extraction unit 19, and an image output unit 20 are similar to those of the image processing apparatus 100 according to the first exemplary embodiment, and an image output unit 20 outputs an image in which the second comparison image is superimposed on the first comparison image or a difference image between the first comparison image and the second comparison image.

Next, a specific example of the process of the image processing apparatus 300 according to this exemplary embodiment will be described with reference to FIGS. 15 and 16.

Figure 16:
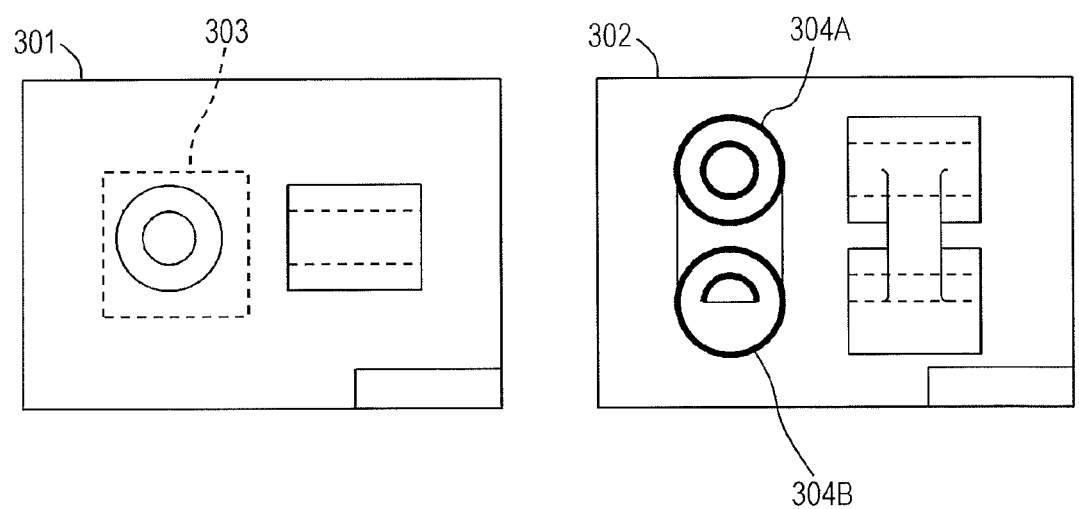
FIG. 16 illustrates a specific example of the process of the image processing apparatus according to the third exemplary embodiment.

FIG. 16 illustrates a first image 301 and a second image 302. It is assumed that the first specified area specifying unit 14 has specified a first specified area 303 (indicated by a broken line).

In this case, as indicated in the second image 302 illustrated in the right portion of FIG. 16, the second comparison area setting unit 13 performs pattern matching between the specified image included in the first specified area 303 and the second image 302, and finds image candidates 304A and 304B. As illustrated in FIG. 16, for example, the found image candidates 304A and 304B are indicated by thick lines, displayed with different colors, or highlighted so that the user may identify the image candidates 304A and 304B. Then, the user selects one of the image candidates 304A and 304B using the input device 5 (see FIG. 2), and a second comparison area is set on the basis of the selected image candidate.

Other processes, for example, the processes of the first comparison area setting unit 12, the geometric difference correction unit 16, the difference extraction unit 19, and the image output unit 20 are similar to those in the specific example of the first exemplary embodiment described above with reference to FIGS. 7 to 10, and a redundant description thereof is thus omitted.

The functional block illustrated in the foregoing exemplary embodiments are merely examples for implementing the respective exemplary embodiments, and are not to be limited to the configuration or arrangement of the functional blocks illustrated herein. Further, the flow diagram is merely an example illustrating the algorithm for achieving the functions in the exemplary embodiments. This is not to be construed in a limiting sense, and any algorithm for implementing similar functions may be used. Moreover, specific examples illustrated herein are merely examples for the purpose of explanation, and the present invention is not to be limited to specific configurations based on such examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image receiving unit that receives a first image and a second image;
    a first specified area specifying unit that allows a user to specify a first specified area within the first image;
    a first comparison area setting unit that sets a first comparison area within the first image on the basis of the first specified area, the first comparison area being different from the first specified area;
    a second comparison area setting unit that sets a second comparison area within the second image;
    a geometric difference correction unit that corrects a difference in geometric properties between a first comparison image in the first comparison area and a second comparison image in the second comparison area; and
    an image output unit that outputs an image in which the second comparison image is superimposed on the first comparison image or a difference image between the first comparison image and the second comparison image,
    wherein the second comparison area setting unit sets the second comparison area from among a plurality of obtained second comparison areas.

2. The image processing apparatus according to claim 1, wherein the first comparison area setting unit sets the first comparison area on the basis of a first specified image included in the first specified area.

3. The image processing apparatus according to claim 1, further comprising a second specified area specifying unit that allows the user to specify a second specified area in the second image,
    wherein the second comparison area setting unit sets the second comparison area in the second image on the basis of the second specified area.

4. The image processing apparatus according to claim 3, wherein the second comparison area setting unit sets the second comparison area on the basis of a second specified image included in the second specified area.

5. The image processing apparatus according to claim 3, wherein the geometric difference correction unit corrects the difference in geometric properties between the first comparison image and the second comparison image on the basis of both the first comparison area and the second comparison area.

6. The image processing apparatus according to claim 3, wherein the geometric difference correction unit corrects the difference in geometric properties between the first comparison image and the second comparison image on the basis of both the first comparison image and the second comparison image.

7. The image processing apparatus according to claim 3, further comprising:
    a first reference point specifying unit that allows the user to specify a first reference point in the first image; and
    a second reference point specifying unit that allows the user to specify a second reference point in the second image,
    wherein the geometric difference correction unit corrects the difference in geometric properties between the first comparison image and the second comparison image on the basis of the first reference point and the second reference point.

8. The image processing apparatus according to claim 3, wherein the second comparison area setting unit sets the first comparison area and the second comparison area on the basis of both the first specified area and the second specified area.

9. The image processing apparatus according to claim 8, wherein the geometric difference correction unit corrects the difference in geometric properties between the first comparison image and the second comparison image on the basis of both the first comparison area and the second comparison area.

10. The image processing apparatus according to claim 1, wherein the second comparison area setting unit sets the second comparison area by searching the second image for an image included in the first specified area or the first comparison area.

11. The image processing apparatus according to claim 10, wherein if a plurality of second comparison area candidates is obtained by searching the second image, the second comparison area setting unit sets the second comparison area by causing the user to specify one of the plurality of second comparison area candidates.

12. The image processing apparatus according to claim 1, wherein the first comparison area setting unit sets the first comparison area to correspond to a bounding rectangle of a first specified image included in the first specified area.

13. A non-transitory computer readable medium storing a program causing a computer to execute a process for image processing, the process comprising:
    receiving a first image and a second image;
    allowing a user to specify a first specified area within the first image;
    setting a first comparison area in the first image on the basis of the first specified area, the first comparison area being different from the first specified area;
    setting a second comparison area within the second image;
    correcting a difference in geometric properties between a first comparison image in the first comparison area and a geometric property of a second comparison image in the second comparison area; and outputting an image in which the second comparison image is superimposed on the first comparison image or a difference image between the first comparison image and the second comparison image, wherein the setting the second comparison area comprises setting the second comparison area from among a plurality of obtained second comparison areas.

14. An image processing method comprising:

receiving a first image and a second image;

allowing a user to specify a first specified area within the first image;

setting a first comparison area in the first image on the basis of the first specified area, the first comparison area being different from the first specified area;

setting a second comparison area within the second image;

correcting a difference in geometric properties between a first comparison image in the first comparison area and a geometric property of a second comparison image in the second comparison area; and outputting an image in which the second comparison image is superimposed on the first comparison image or a difference image between the first comparison image and the second comparison image, wherein the setting the second comparison area comprises setting the second comparison area from among a plurality of obtained second comparison areas.

* * * * *